United States Patent
Roekens

(10) Patent No.: US 7,627,925 B2
(45) Date of Patent: Dec. 8, 2009

(54) SPOILER FOR A WINDSCREEN WIPER BLADE

(75) Inventor: Jurgen Roekens, Steenokkerseel (BE)

(73) Assignee: Robert Bosch GmbH, Stuttgart (DE)

( * ) Notice: Subject to any disclaimer, the term of this patent is extended or adjusted under 35 U.S.C. 154(b) by 1136 days.

(21) Appl. No.: 10/363,100

(22) PCT Filed: Jul. 6, 2001

(86) PCT No.: PCT/DE01/02441

§ 371 (c)(1),
(2), (4) Date: Jun. 26, 2003

(87) PCT Pub. No.: WO03/004324

PCT Pub. Date: Jan. 16, 2003

(65) Prior Publication Data

US 2004/0010881 A1  Jan. 22, 2004

(51) Int. Cl.
*B60S 1/38* (2006.01)
(52) U.S. Cl. ............... 15/250.201; 15/257.01
(58) Field of Classification Search ............ 15/250.201, 15/250.451–454, 48, 250.44, 250.43, 250.361, 15/257.01; D12/219, 220; 416/9, 12, 13, 416/55, 59
See application file for complete search history.

(56) References Cited

U.S. PATENT DOCUMENTS 6,067,687 A * 5/2000 Shih ...................... 15/250.201
6,499,179 B1 * 12/2002 Fink et al. ................ 15/250.04

FOREIGN PATENT DOCUMENTS

| DE | 4017078 | * | 11/1991 |
| DE | 196 27 113 A | | 1/1998 |
| DE | 100 16 571 A | | 10/2001 |
| EP | 0 599 637 A1 | | 6/1994 |
| FR | 2 737 455 A | | 2/1997 |

OTHER PUBLICATIONS

Patent Asbtracts of Japan vol. 018, No. 611 (M-1708), Nov. 21, 1994 & JP 06 234353 A, Aug. 23, 1994.

* cited by examiner

*Primary Examiner*—Gary K Graham
(74) *Attorney, Agent, or Firm*—Michael J. Striker

(57) ABSTRACT

A spoiler for a windshield wiper blade having least one retaining tab (16) and at least one detent element, disposed on the retaining tab, that is intended to snap onto a support bracket (10) of the windshield wiper blade, and that has two detent tabs (28), is to be further developed in such a way that reliable positioning on the support bracket is possible. To that end, the detent element (18) has two contact parts (22), which are disposed spaced apart from one another in the longitudinal direction of the spoiler (14). The two detent tabs (28) are disposed between the contact parts (22).

5 Claims, 5 Drawing Sheets

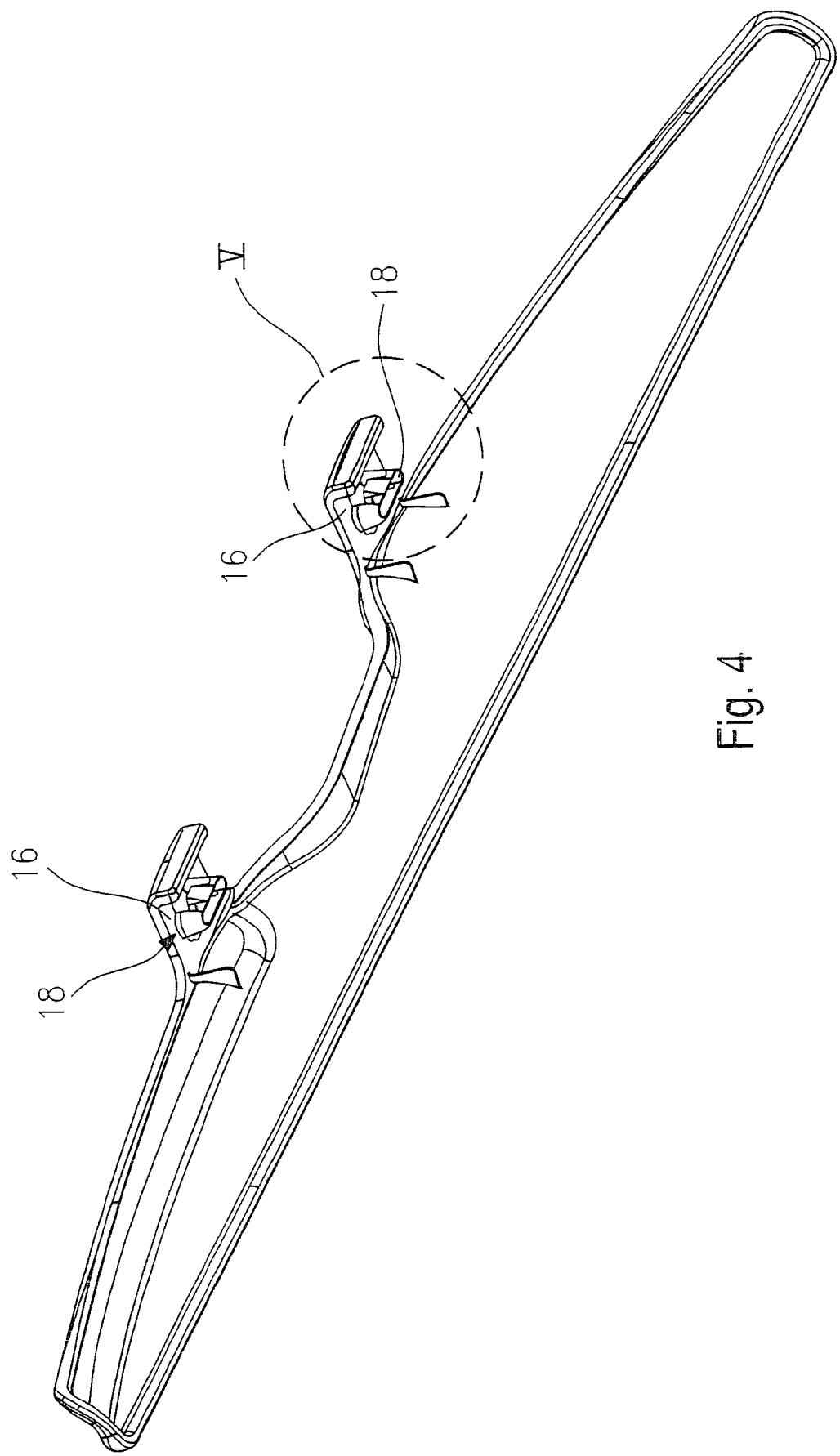

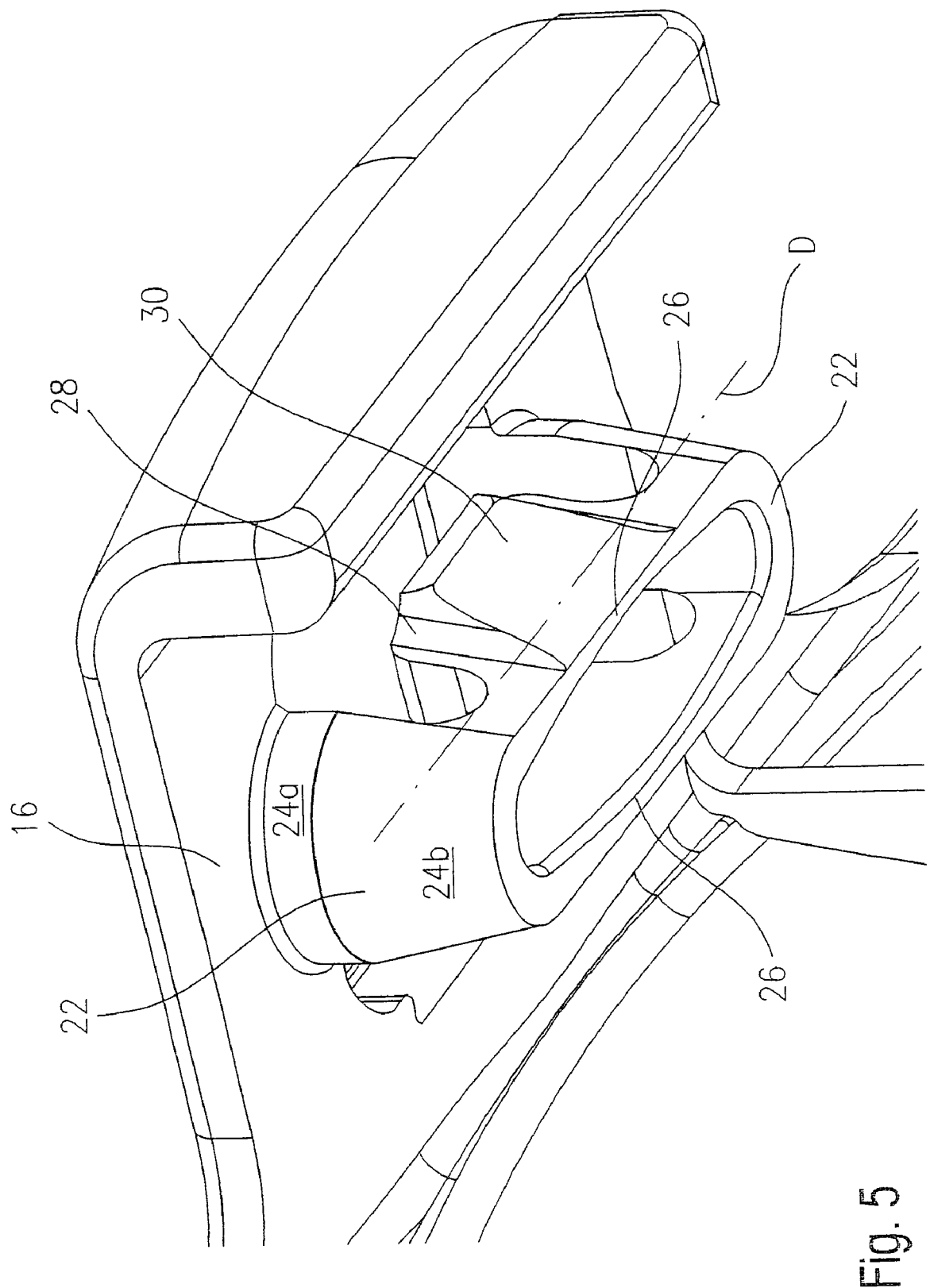

SPOILER FOR A WINDSCREEN WIPER BLADE

CROSS REFERENCE

The invention described and claimed herein below is also described in international application PCT/DE01/02441, filed on Jul. 6, 2001, of which this application is a 371 filing of.

BACKGROUND OF THE INVENTION

The invention relates to a spoiler for a windshield wiper blade, having at least one retaining tab and at least one detent element, disposed on the retaining tab, that is intended to snap onto a support bracket of the windshield wiper blade, and that has two detent tabs.

One such spoiler, known from European Patent Disclosure EP 0 599 637 A1, serves to assure that at relatively high vehicle speeds, the windshield wiper presses against the window to be cleaned with the requisite contact pressure. The spoiler is provided with two spaced-apart detent elements, which each engage one oblong slot in the support bracket. The detent tabs are disposed on the detent elements in such a way that they engage the edges of the oblong slot that are opposite one another in the longitudinal direction. As a result, forces acting on the spoiler and oriented parallel to the longitudinal axis of the support bracket act on the detent elements and can deform them.

The object of the invention is to refine a spoiler of the type defined at the outset in such a way that improved positioning of the spoiler on the windshield wiper blade is obtained.

SUMMARY OF THE INVENTION

The spoiler of the invention has the advantage that reliable positioning of the spoiler is assured by means of the contact parts. In general terms, the spoiler of the invention is based on a functional separation between the detent tabs and the contact parts. The contact parts, by contact with the edge of the corresponding opening in the support bracket, assure that the spoiler is optimally positioned and cannot slip when forces act on it. The detent tabs serve solely to prevent the contact parts from being pulled out of the opening in the support bracket. Because of the contact parts, it is assured that the detent tabs cannot become warped by forces acting on the spoiler, and overall this assures an especially reliable fastening to the support bracket.

In a preferred embodiment of the invention, it is provided that the outer faces of the two contact parts extend at an angle other than 90° relative to the plane of the retaining tab, so that they act in the manner of an insertion bevel. This facilitates mounting the spoiler on the support bracket and snapping it into place.

Preferably, it is provided that the two contact parts, in a section parallel to the plane of the retaining tab, each have an approximately semicircular cross section, and that the two contact parts are joined together by two connecting ribs, which extend from the end, remote from the retaining tab, of the corresponding contact part to the respective opposite contact part. The connecting ribs stabilize the contact parts and increase the strength.

In the preferred embodiment of the invention, it is provided that each of the two detent tabs is disposed on one of the connecting ribs and extends from that connecting rib in the direction of the retaining tab. With this design, the requisite elasticity of the detent tabs can be achieved with very little effort or expense.

BRIEF DESCRIPTION OF THE DRAWINGS

The invention is described below in terms of a preferred embodiment, which is shown in the accompanying drawings. Shown in them are:

FIG. 4, in a perspective view from below, a spoiler; and

FIG. 5, on a larger scale, the detail V of FIG. 4.

DETAILED DESCRIPTION OF THE EXEMPLARY EMBODIMENT

Figure 1:
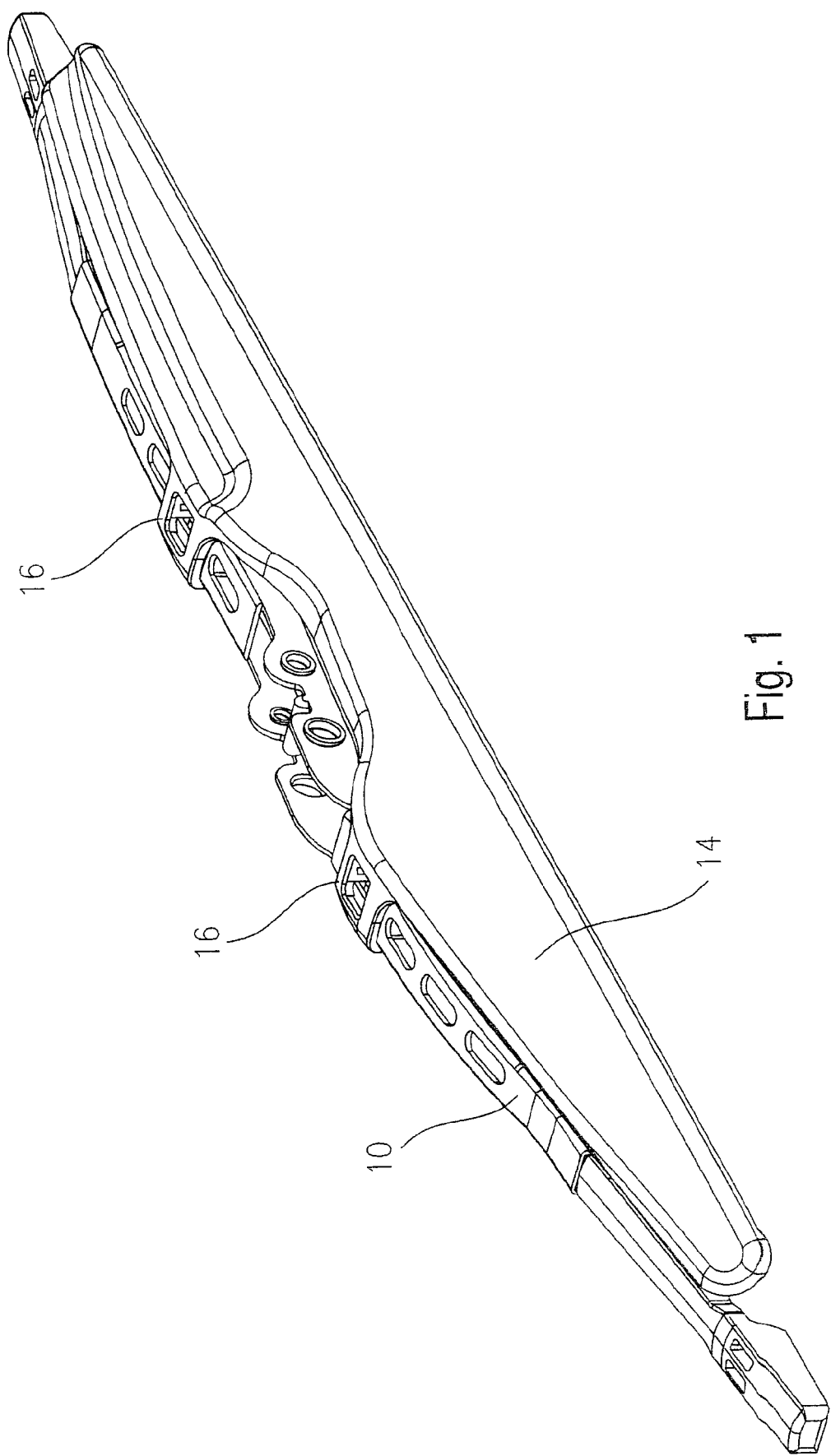
FIG. 1, in a perspective view, a windshield wiper blade with a spoiler mounted on it.
Figure 2:
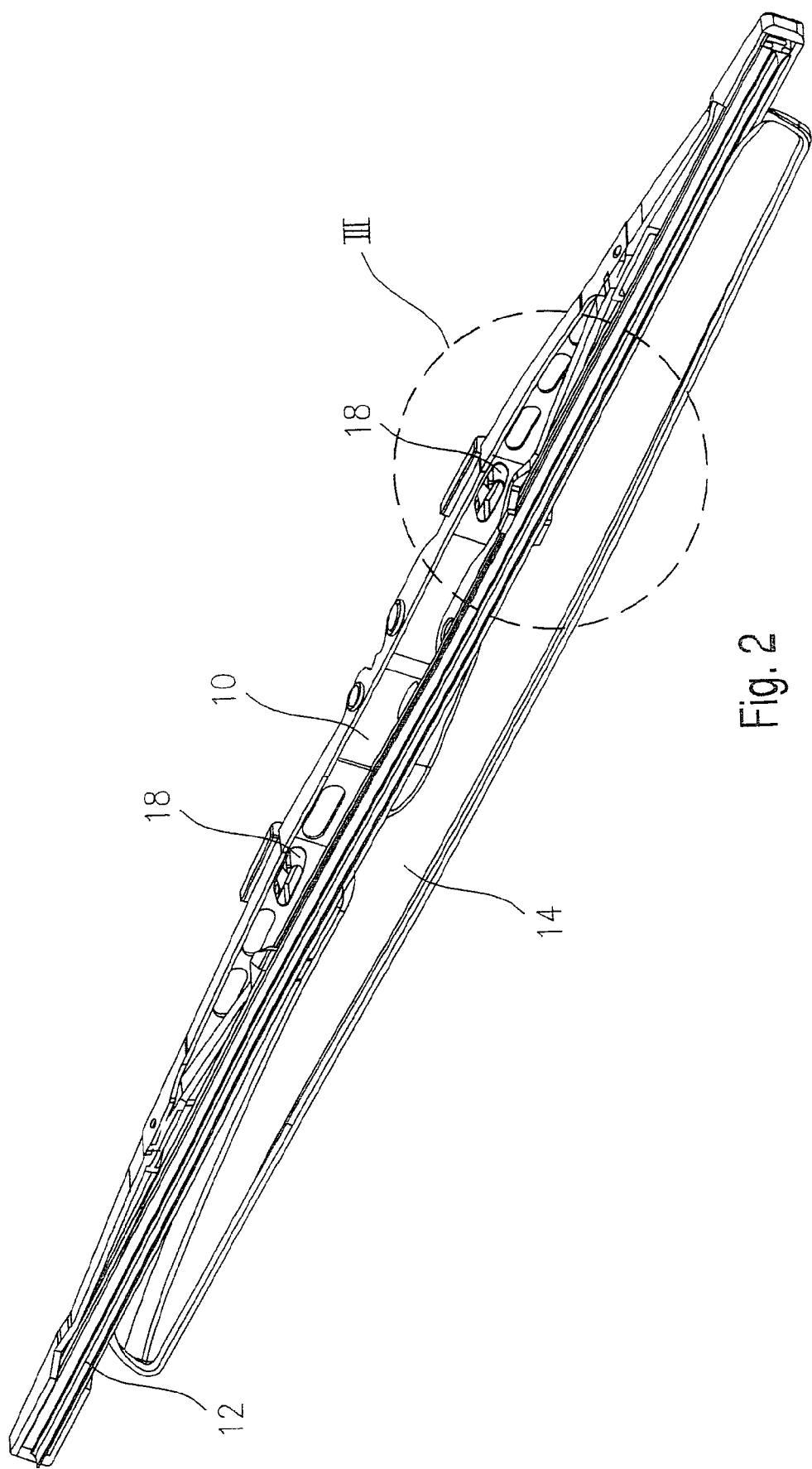
FIG. 2, in a perspective view from below, the windshield wiper blade with the spoiler of FIG. 1.
Figure 3:
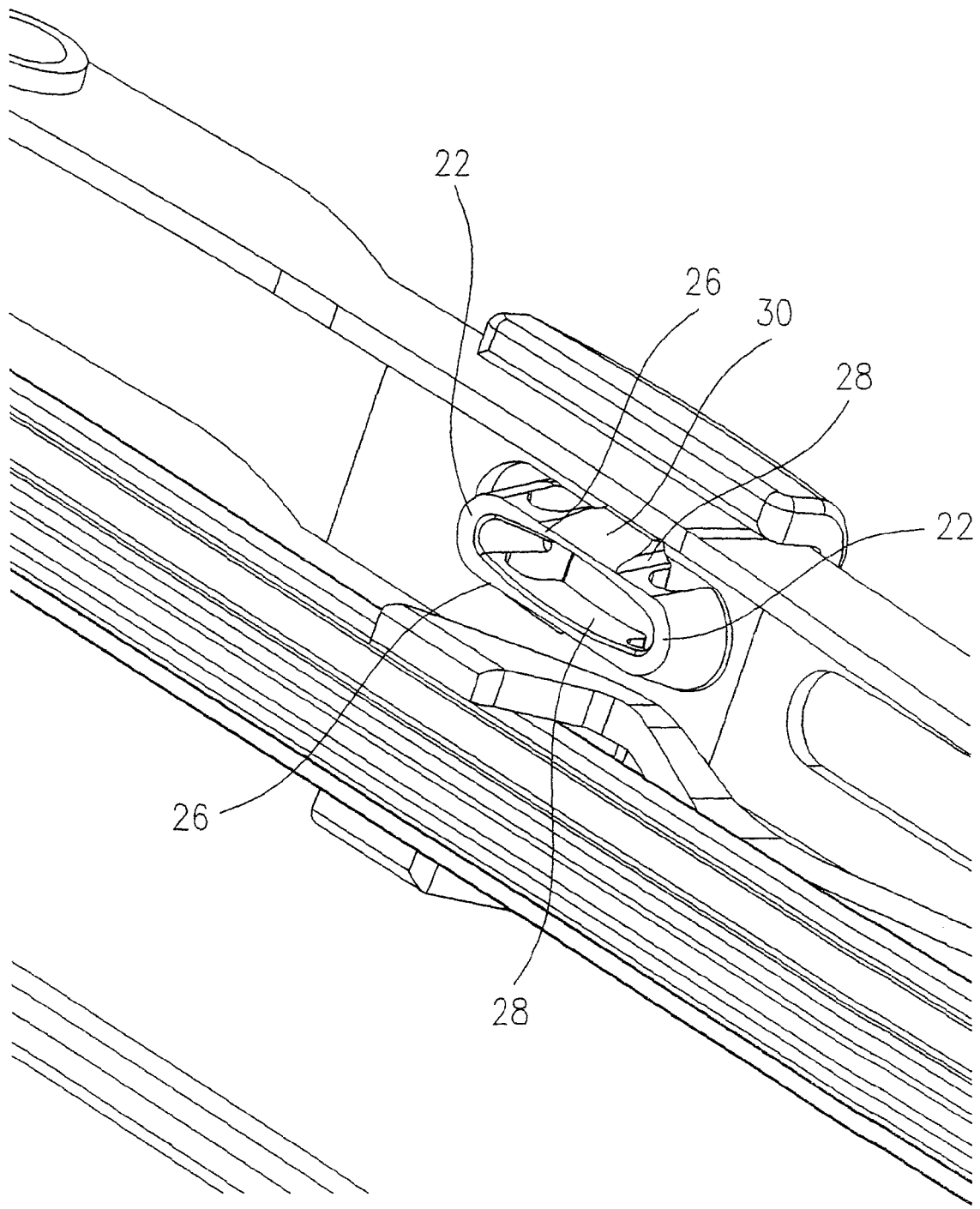
FIG. 3, on a larger scale, the detail III of FIG. 2.

In FIG. 1, a support bracket 10 is shown, which is intended to be secured to a wiper arm (not shown) and to hold a wiper strip 12 (see FIG. 2). A spoiler 14 (see also FIG. 4) is mounted on the support bracket 10 and serves to prevent the wiper strip 12 from lifting from the window to be cleaned when the vehicle, provided with the windshield wiper blade comprising the wiper strip and the support bracket, is moving at relatively high speed.

The spoiler 14 has two retaining tabs 16, which are spaced apart from one another along the longitudinal axis of the spoiler. Each retaining tab 16 is provided with a detent element 18, which is intended to be snapped into an oblong-slotlike recess 20.

Each detent element 18 has two contact parts 22, which are opposite one another and spaced apart, as viewed along the longitudinal axis of the spoiler. Each contact part, viewed in a cross section parallel to the retaining tab 16, has the cross section of a ring, which extends over an angular range of approximately 180°. The two contact parts are disposed and dimensioned such that the contour defined by them in the region of the transition to the retaining tab 16 is approximately equivalent to the contour of the recess 20 in the support bracket. To make it easier to insert the detent elements into the corresponding recesses in the support bracket, the two contact parts are embodied such that beginning at a transition portion, whose outer face 24a extends approximately perpendicular to the plane of the retaining tab 16, they taper on the order of an insertion bevel toward their end remote from the retaining tab; that is, the outer face 24b of the tapering portion forms an angle other than 90° with the plane of the retaining tab 16.

The two contact parts 22 are joined together, on their end remote from the retaining tab 16, by two connecting ribs 26, so that the detent elements have a continuous face end on their side remote from the retaining tab. Each connecting rib 26 is provided with a detent tab 28, which extends from the respective connecting rib 26 in the direction of the retaining tab 16. Each detent tab 28 is provided, on its outer side, with a ramp 30, which beginning at the end of the corresponding detent element remote from the retaining tab 16 has an increasing thickness toward the retaining tab.

For mounting, the spoiler need merely be pressed onto the support bracket 10. Because of the obliquely extending outer faces 24b of the contact parts, the detent elements can easily be introduced into the corresponding recesses in the support bracket. Upon the insertion of the detent elements into the recesses, the detent tabs are pressed inward by contact of the ramps 30 with the outer edge of the recesses, and are pivoted about the pivot axis D shown in FIG. 5. They can snap elastically outward again back into their original position, once the detent elements have been thrust through the recesses so far that the retaining tabs 16 contact the outer side of the support bracket. The detent tabs then rest with their free end on the underside of the support bracket and prevent the spoiler from being able to be removed from the support bracket. By means of their outer faces 24a, the contact parts assure that the spoiler is optimally positioned on the support bracket.

LIST OF REFERENCE NUMERALS

| | |
|---|---|
| 10: | Support bracket |
| 12: | Wiper strip |
| 14: | Spoiler |
| 16: | Retaining tab |
| 18: | Detent element |
| 20: | Recess |
| 22: | Contact part |
| 24a: | Outer face |
| 24b: | Outer face |
| 26: | Connecting rib |
| 28: | Detent tab |
| 30: | Ramp |
| D: | Pivot axis |

The invention claimed is:

1. A spoiler for a windshield wiper blade, having at least one retaining tab (16) and at least one detent element (18), disposed on the retaining tab, that is intended to snap onto a support bracket of the windshield wiper blade, and that has two detent tabs (28), wherein the detent element has two contact parts (22), which are disposed spaced apart from one another in the longitudinal direction of the spoiler, and that the two detent tabs are disposed between the contact parts, wherein the two contact parts (22), in a section parallel to a plane of the retaining tab, each have an approximately semicircular cross section, and that the two contact parts are joined together by two connecting ribs (26), which extend from an end, remote from the retaining tab, of the corresponding contact part to the respective opposite contact part.

2. The spoiler of claim 1, wherein each of the two detent tabs (28) is disposed on one of the connecting ribs (26) and extends from that connecting rib in the direction of the retaining tab.

3. A component assembly, comprising a windshield wiper blade with a support bracket (10) and a spoiler (14), wherein the spoiler has at least one retaining tab (16) and at least one detent element (18) disposed on the retaining tab that is intended to snap onto the support bracket, wherein the detent element has two contact parts (22) which are disposed spaced apart from one another in a longitudinal direction of the spoiler, wherein two detent tabs (28) are disposed between the contact parts, wherein the two contact parts (22), in a section parallel to a plane of the retaining tab, each have an approximately semicircular cross section, and that the two contact parts are joined together by two connecting ribs (26), which extend from an end, remote from the retaining tab, of the corresponding contact part to the respective opposite contact part.

4. A component assembly of claim 3, wherein outer faces of the two contact parts (22) extend at an angle other than 90° relative to the plane of the retaining tab, so that they act in a manner of an insertion bevel.

5. A component assembly of claim 3, wherein the contact parts (22) of the detent element are disposed and dimensioned such that each contact part rests on one of ends of an elongated recess.

* * * * *